United States Patent [19]
Lewicki et al.

[11] Patent Number: 6,026,127
[45] Date of Patent: Feb. 15, 2000

[54] AUTOZERO TECHNIQUE FOR A PHASE LOCKED LOOP SYSTEM

[75] Inventors: Laurence Douglas Lewicki; George Edmond Seiler, both of Sunnyvale, Calif.

[73] Assignee: National Semiconductor Corporation, Santa Clara, Calif.

[21] Appl. No.: 08/775,044

[22] Filed: Dec. 27, 1996

Related U.S. Application Data

[60] Provisional application No. 60/009,467, Dec. 28, 1995.
[51] Int. Cl.$^7$ ........................................ H04B 1/12
[52] U.S. Cl. ................. 375/319; 375/345; 375/346; 330/285; 330/291; 330/98; 455/251.1
[58] Field of Search .................. 375/319, 345, 375/346, 376; 455/234.1, 246.1, 247.1, 251.1; 330/285, 291, 98

[56] References Cited

U.S. PATENT DOCUMENTS

| | | |
|---|---|---|
| 5,503,770 | 4/1996 | Mayer et al. .................. 341/118 |
| 5,550,512 | 8/1996 | Fukahori ........................ 330/254 |
| 5,566,213 | 10/1996 | Carsello ......................... 375/344 |
| 5,757,219 | 5/1998 | Weedon et al. ................. 327/307 |

*Primary Examiner*—Amanda T. Le
*Attorney, Agent, or Firm*—Limbach & Limbach LLP

[57] ABSTRACT

An autozero method and system that cancels offset for use in an AMI or like system and that operates while data is being transmitted and does not require a retraining sequence. The system applies the offset correction feedback in a unique way inside the traditional feedback loop. The system also provides a unique method of introducing offset correction into an analog feedback loop prior to the last gain stage such that the offset cancellation point is inside the feedback loop. This allows a straight forward implementation which does not have to compensate for the offset change due to the gain of the last stage. A digital control system allows the AGC and the autozero to be active in the same feedback loop and to interact with no adverse affects during the transmission of data.

4 Claims, 11 Drawing Sheets

AUTOZERO TECHNIQUE FOR A PHASE LOCKED LOOP SYSTEM

RELATED APPLICATION

This application claims the benefit of U.S. Provisional Application No. 60/009,467, filed Dec. 28, 1995, and entitled "Autozero Technique for a Phase Locked Loop System."

BACKGROUND OF THE INVENTION

It would be desirable to have available devices that provide ISDN data transmission rates of 144 kbit/sec. over normal phone lines of up to 1.8 km in a PBX system. These devices would operate as a short loop 'U' interface in typical PBX applications. To achieve this in a cost effective manner, the devices would be designed to transmit and detect bursts of alternate mark inversion (AMI) data packets sent in a time-compression multiplexed (TCM) or ping-pong method to achieve the same rate of data transmission as a standard 'U' interface.

The design would be optimized by providing an autozero circuit to cancel the offset through the receive path of the device. Reducing the offset through the system provides additional noise immunity with respect to the mark level detectors. This helps insure good data transmission, especially at longer line lengths where the attenuation due to the phone lines results in the smallest AMI pulse in the application. The object of this design would be to provide devices with a naturally high offset (+/−350 mV) with the additional noise immunity needed to transmit data reliably, even in the presence of noise. Currently, high offset parts which may be good are typically scrapped rather than increasing test time to perform a bit error rate (BER) test on a tester, which is prohibitively expensive.

Therefore, it is an object of the present invention to provide an autozero system that dynamically cancels the offset in the receive path of the device. The autozero circuit handles the shifts in total receive path offset due to the shifts in both the coarse and the fine AGC gain settings.

SUMMARY OF THE INVENTION

The present invention provides a system that cancels offset for use in an AMI or like system which operates while data is being transmitted and does not require a retraining sequence. The invention also provides a unique method of introducing offset correction into an analog feedback loop prior to the last gain stage such that the offset cancellation point is inside the feedback loop. This allows a straight forward implementation which does not have to compensate for the offset change due to the gain of the last stage. A digital control system allows the AGC and the autozero to be active in the same feedback loop and to interact with no adverse affects during the transmission of data. The autozero directly measures all system parameters associated with the offset seen by the mark comparators. The design makes use of data already available in the system to make its measurements of offset. As a result, it requires minimum additional circuitry. Since the autozero measures only the relative differences between the positive and negative marks, the data input to the autozero system is already in an ultra-condensed form and requires very minimal circuitry to measure and adjust for the offset. There is no need to add filtering to remove unwanted data from the offset measurements.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 1:
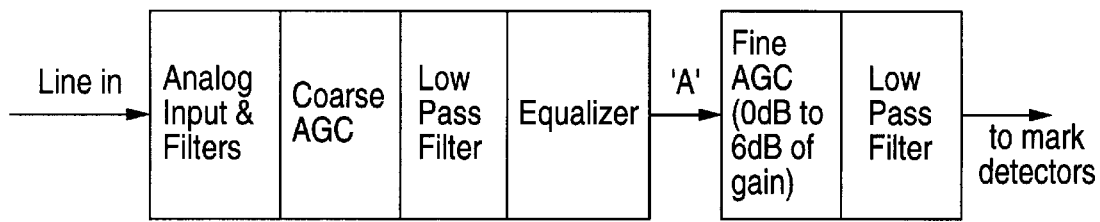
FIG. 1 is a block diagram illustrating a receive path.

There are two main components which comprise the total offset of the receive path of a device in accordance with the present invention. Referring to FIG. 1, the first component is the system offset from the input signal through to point 'A'. The offset at point 'A' is almost constant over the coarse AGC settings. The offset actually increases slightly as the gain setting of the coarse AGC increases. The assumption is made that the offset at point 'A' remains constant over coarse AGC settings because the offset change at point 'A' is minor compared to the offset to be cancelled.

Figure 2:
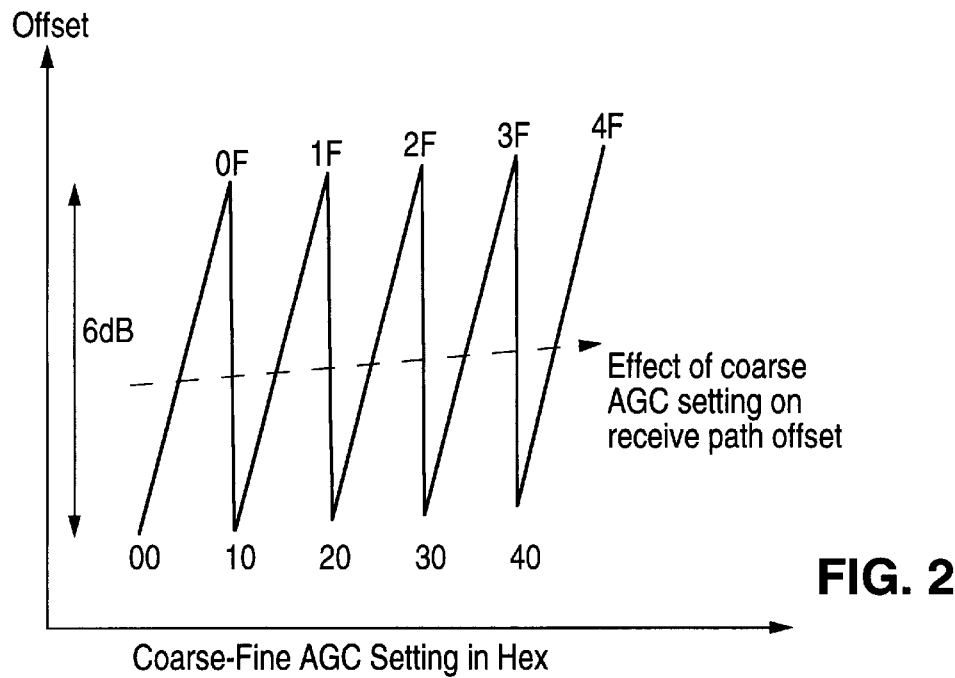
FIG. 2 is a graph plotting offset for a complete receive path versus coarse-fine AGC setting in Hex.

The offset at point 'A' is gained up by the fine AGC by a factor between 0 dB and 6 dB in sixteen equal gain steps. FIG. 2 shows that the total receive path offset is equal to offset at point 'A' times the gain setting of the fine AGC. The design of the autozero circuit requires that adjustments in offset correction should be monotonic and small enough not to dominate the AGC gain control system. In the worst case, the gain of the fine AGC can change the total system gain by 6 dB between adjacent fine AGC settings. A transition in the fine AGC setting from 0 to F will result in a +6 dB change in total system offset. Similarly, a transition in the fine AGC setting from F to 0 will result in a −6 dB change in total system offset.

For example, for a typical system offset of 100 mV at point 'A', the total system offset for the receive path would vary between 100 mV for a fine AGC setting of 0 and 200 mV for a fine AGC setting of F.

Since the offset of every device will vary with the 0 dB to 6 dB gain of the fine AGC, compensating for the offset by feedback applied at the input would be difficult and cumbersome. The major problem would be trying to design a complex enough feedback network to compensate for the system offset changes due to the 6 dB variation of gain contributed by the fine AGC. The 6 dB receive path offset shifts between the fine AGC settings 0 an F mentioned above could be large enough to disturb the balance between the autozero and the AGC. This would be undesirable because the entire system could settle with the wrong AGC state and compromise the BER.

In an autozero design in accordance with the present invention, the feedback method attempts to cancel the offset at point 'A' while measuring the effective offset at the output of the receive path. The advantage of this approach is that the offset changes caused by the gain of the fine AGC at the output of the receive path do not need to be compensated for in the control scheme of the design. The analog feedback method automatically gains up the offset correction from the autozero introduced at point 'A' by the exact same gain applied to the signal, and therefore, the offset at point 'A'. The structure of the feedback system guarantees that if a signal is applied at point 'A' from the autozero which reduces the offset at point 'A', then the overall system offset will also be reduced regardless of the gain of the fine AGC setting.

The goal of our autozero circuit is to improve product yield by efficiently cancelling the system offset and guaranteeing that the device will meet specification without adding a costly BER test which would make the device too costly. This solution must also be able to adapt dynamically without a training sequence and to account for all of the above-mentioned factors.

The offset of the system can be measured at the output of the receive path by measuring the widths of both the positive and negative mark detect comparators using a 6.144 Mhz switched capacitor clock. The mark detect comparators determine when the signal present at the output of the receive path is considered a positive or a negative "I". In the ideal case where no offset is present, the width of the positive and negative mark detect signals would be equal. If there is an offset at the output, then the difference between the width of these two signals will be proportional to the offset of the receive path.

In our circuit, the offset is measured at the output of the receive path and the offset correction factor is introduced at point 'A', just before the fine AGC gain stage. We are attempting to cancel the offset at point 'A' because the offset at 'A' remains almost constant over all coarse and fine AGC settings. Introducing the offset correction factor at point 'A' greatly reduces the complexity necessary to implement the digital control of the autozero. A system that cancels the offset at point 'A' regardless of the fine AGC setting, cancels the offset of the entire system When the offset at 'A' is reduced by the autozero circuit, the overall offset of the complete receive path is also reduced by the same factor since the system offset is equal to the offset at point 'A' multiplied by the gain of the fine AGC. The offset will still vary by the 6 dB gain of the fine AGC, but the overall offset will be reduced because the offset at 'A' has been reduced.

It should be noted that this is an unusual feedback system. If we attempted to implement a classical feedback system, an offset correction factor would be introduced at the input of the receive path to cancel the offset at the output. If we did this in a conventional design, we would have to account for the change in the total receive path offset due to the gain of the fine AGC. This would make the design impractical because there would be too many special cases to verify and account for in the design.

We decided to use the fact that the offset at point 'A' remains constant over both coarse and fine AGC settings. Since we need to introduce an offset correction factor which attempts to cancel the offset at 'A' and also tracks with the gain of the fine AGC, we designed the feedback network such that the offset correction is accomplished by feeding the offset correction signal into the fine AGC gain stage.

The offset correction signal has been fed into the bottom plates of the fine AGC capacitors. This structure guarantees that the offset correction factor will be gained up by the same factor (fine AGC gain) as the offset in the system after point 'A'. Therefore, the offset correction factor automatically tracks the system offset changes in the output of the receive path caused by the gain of the fine AGC. This approach eliminates the need for designing an autozero scheme which attempts to directly compensate for offset changes caused by fine AGC gain. Any system attempting a classical feedback system would have to introduce a complex set of offset correction criteria based on the fine AGC setting and it would be very difficult to verify correct operation over all possible cases.

In the original design, the bottom plates of the fine AGC stage were connected to Vcm in a common switched capacitor gain stage. In order to introduce an offset into the fine AGC stage, the voltage on the bottom plate of the fine AGC capacitors needed to be controlled. Since the fine AGC gain stage is inverting, the signal at point 'A' is an inverted version of the output signal of the receive path. Therefore, an increase in the voltage above Vcm applied to the bottom plates of the fine AGC introduces an offset which cancels a negative offset in the complete receive path and a decrease in voltage cancels a positive offset.

Figure 3:
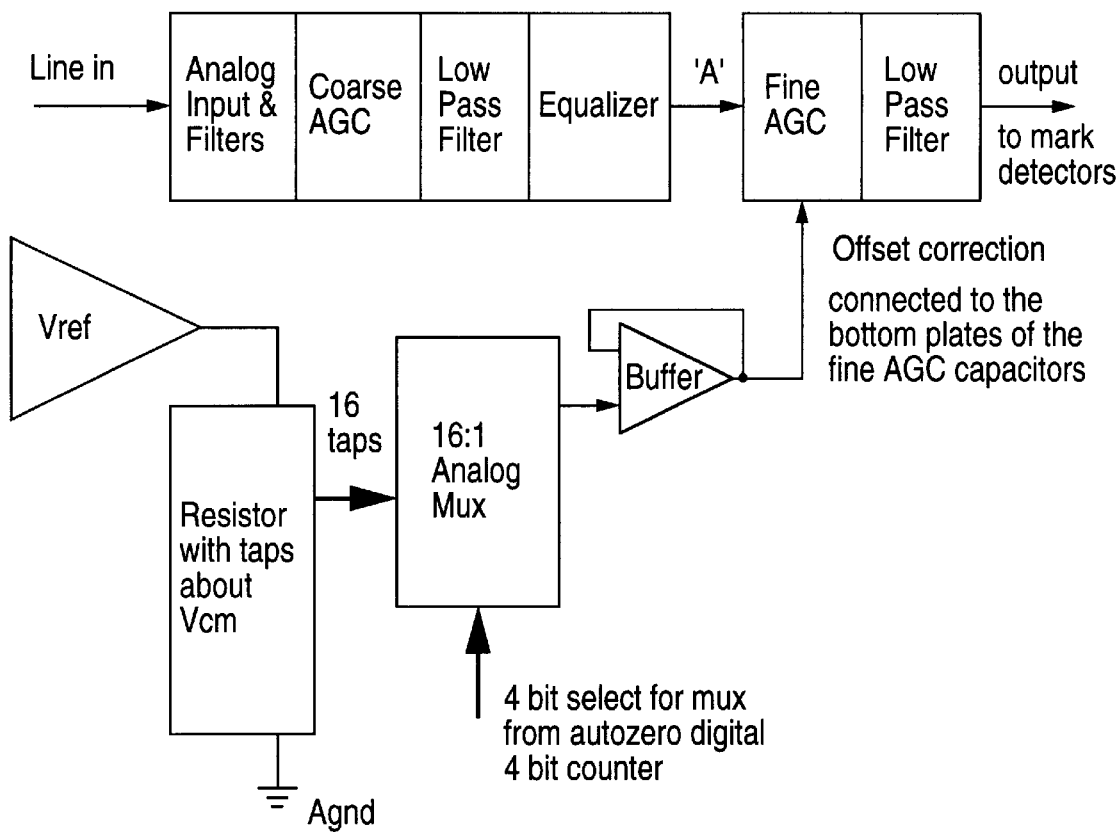
FIG. 3 is a block diagram illustrating an autozero system in accordance with the present invention.
Figure 10:
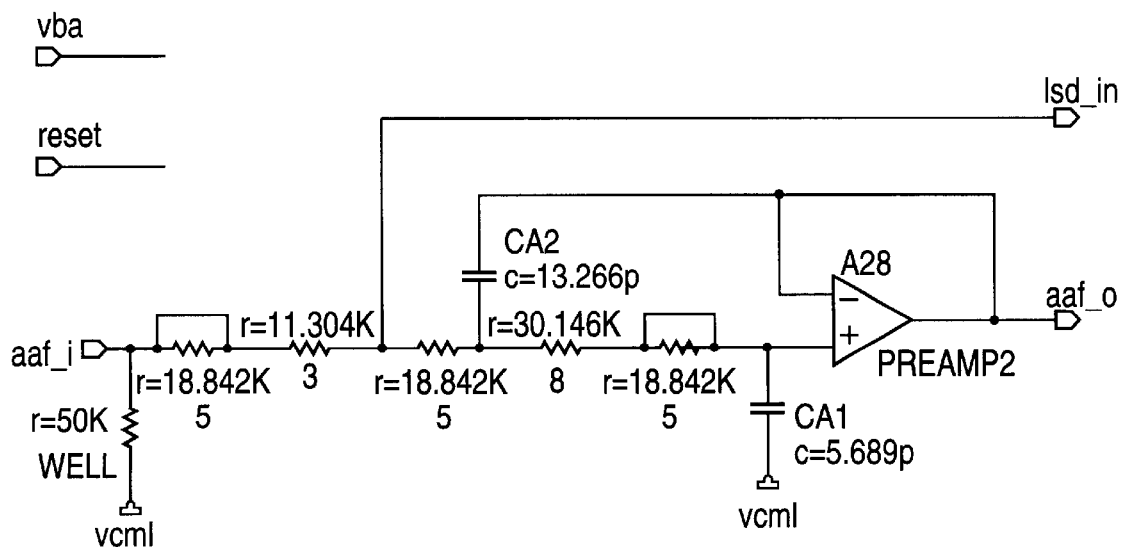
FIG. 10 is a schematic diagram illustrating details of the aaf block in FIG. 9.
Figure 5:
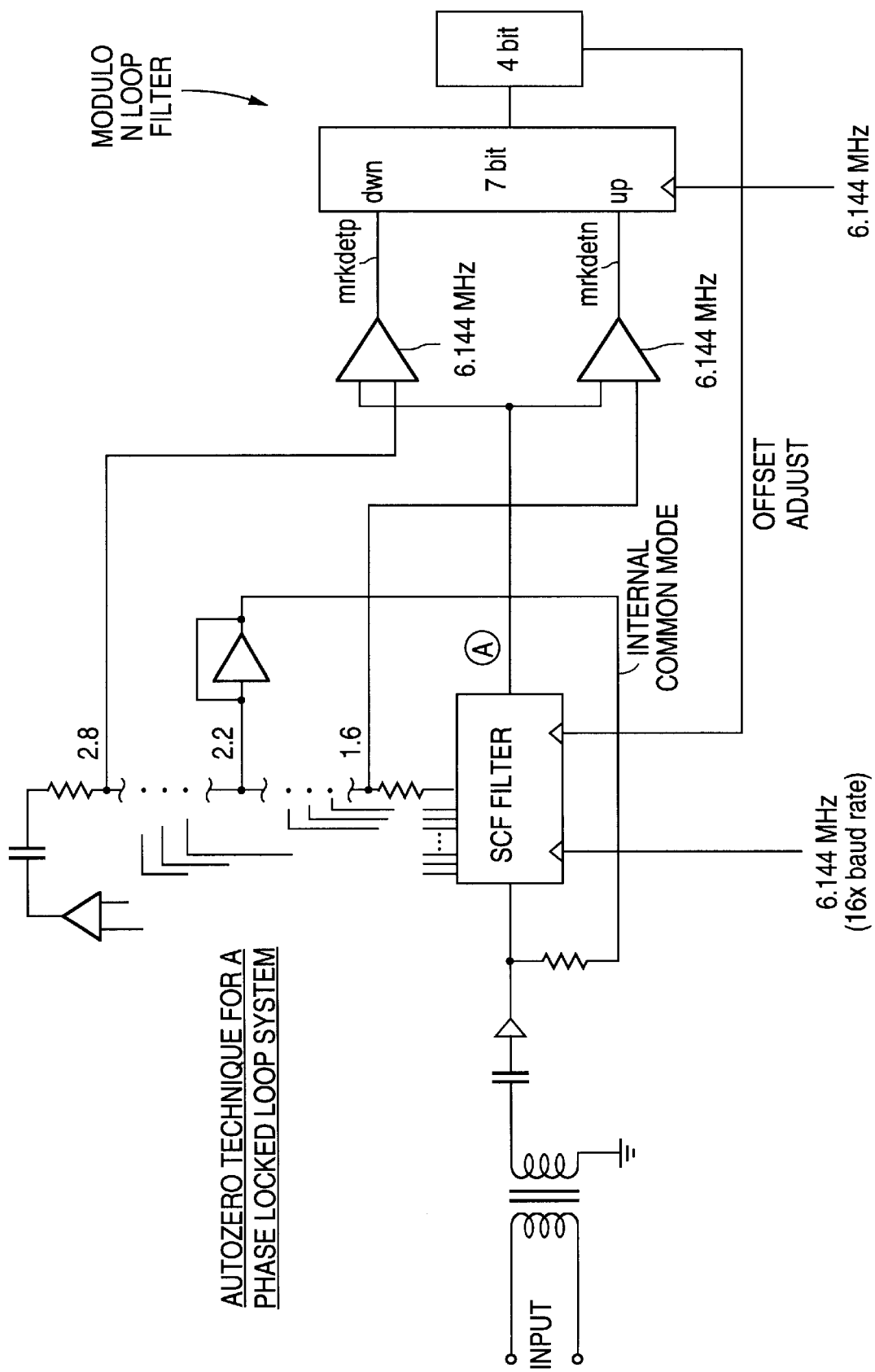
FIG. 5 is a block diagram illustrating the FIG. 3 system in greater detail.
Figure 6:
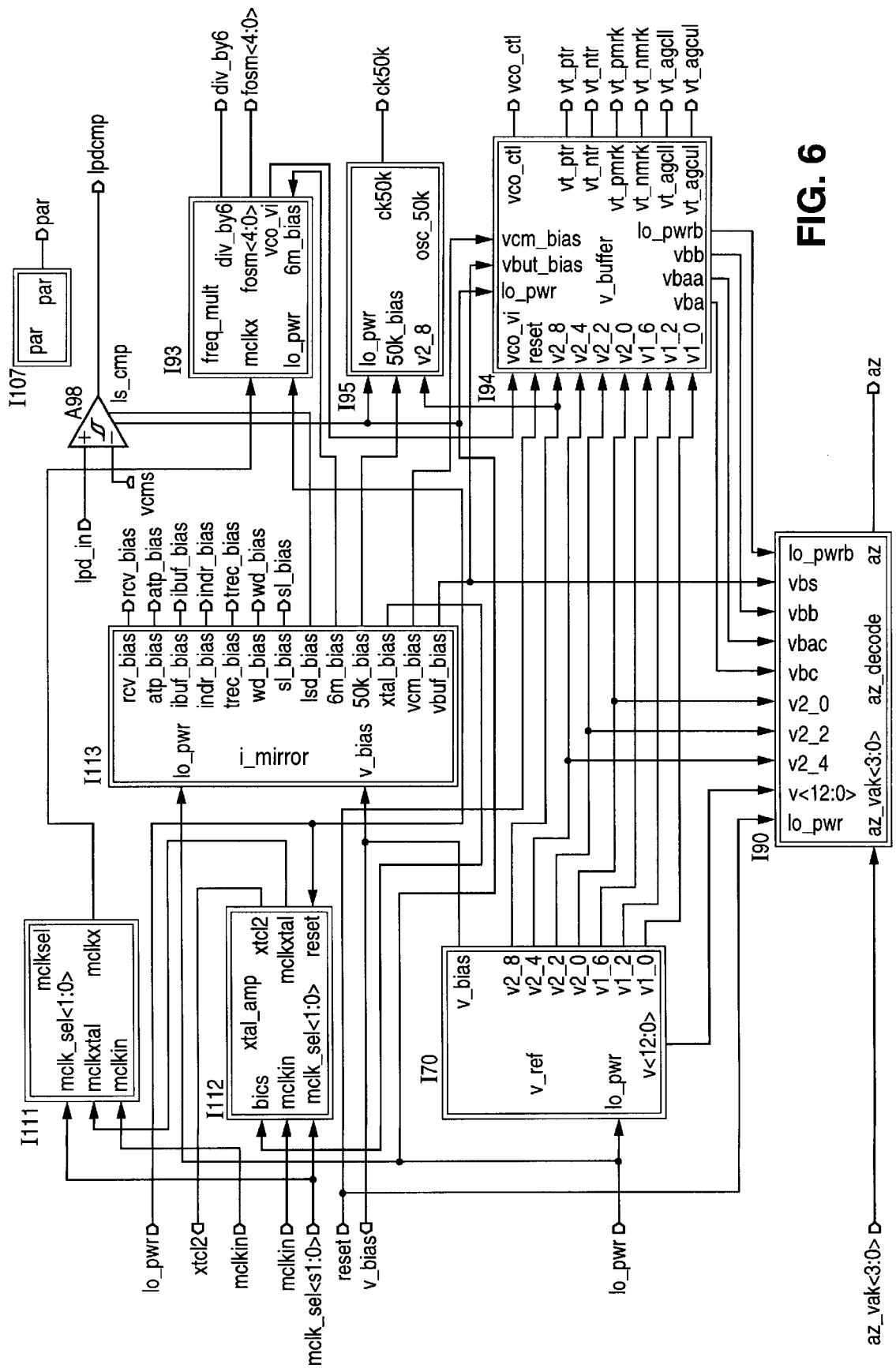
FIG. 6 is a block diagram illustrating details of autozero circuitry in accordance with the present invention.
Figure 7:
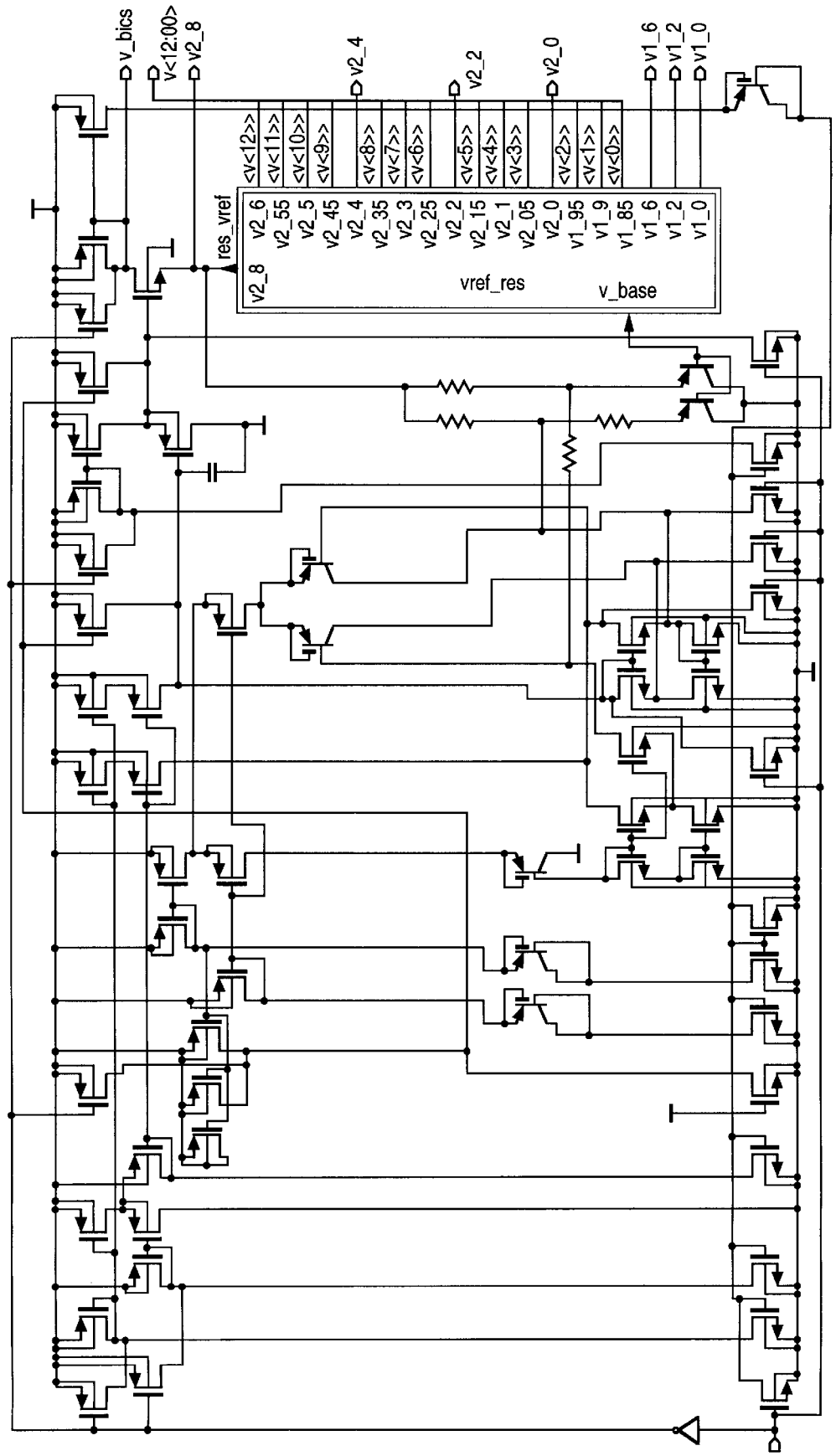
FIG. 7 is a schematic diagram illustrating details of the v_ref block in FIG. 6.
Figure 8:
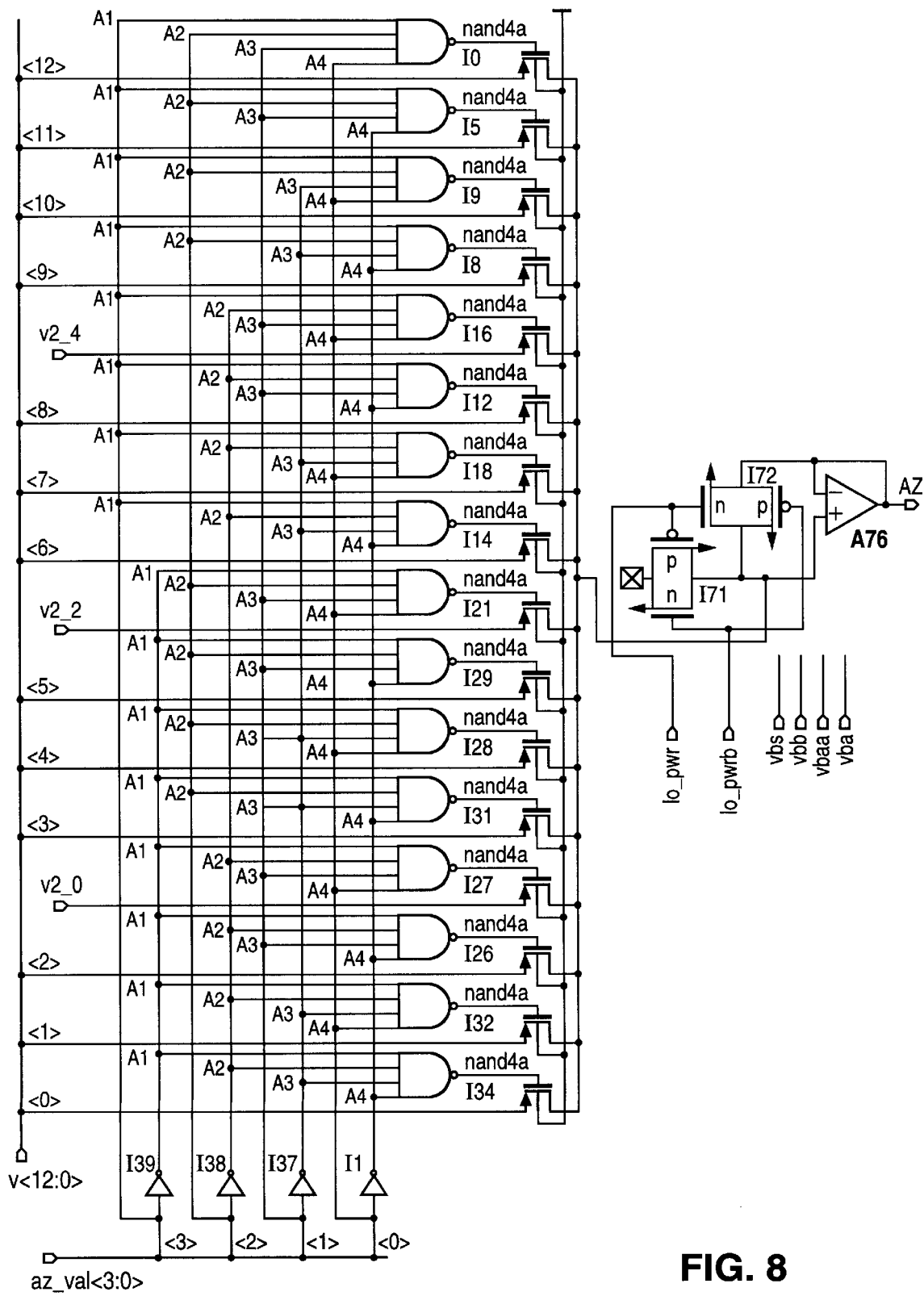
FIG. 8 is a schematic diagram illustrating details of the az_decode block in FIG. 6.
Figure 9:
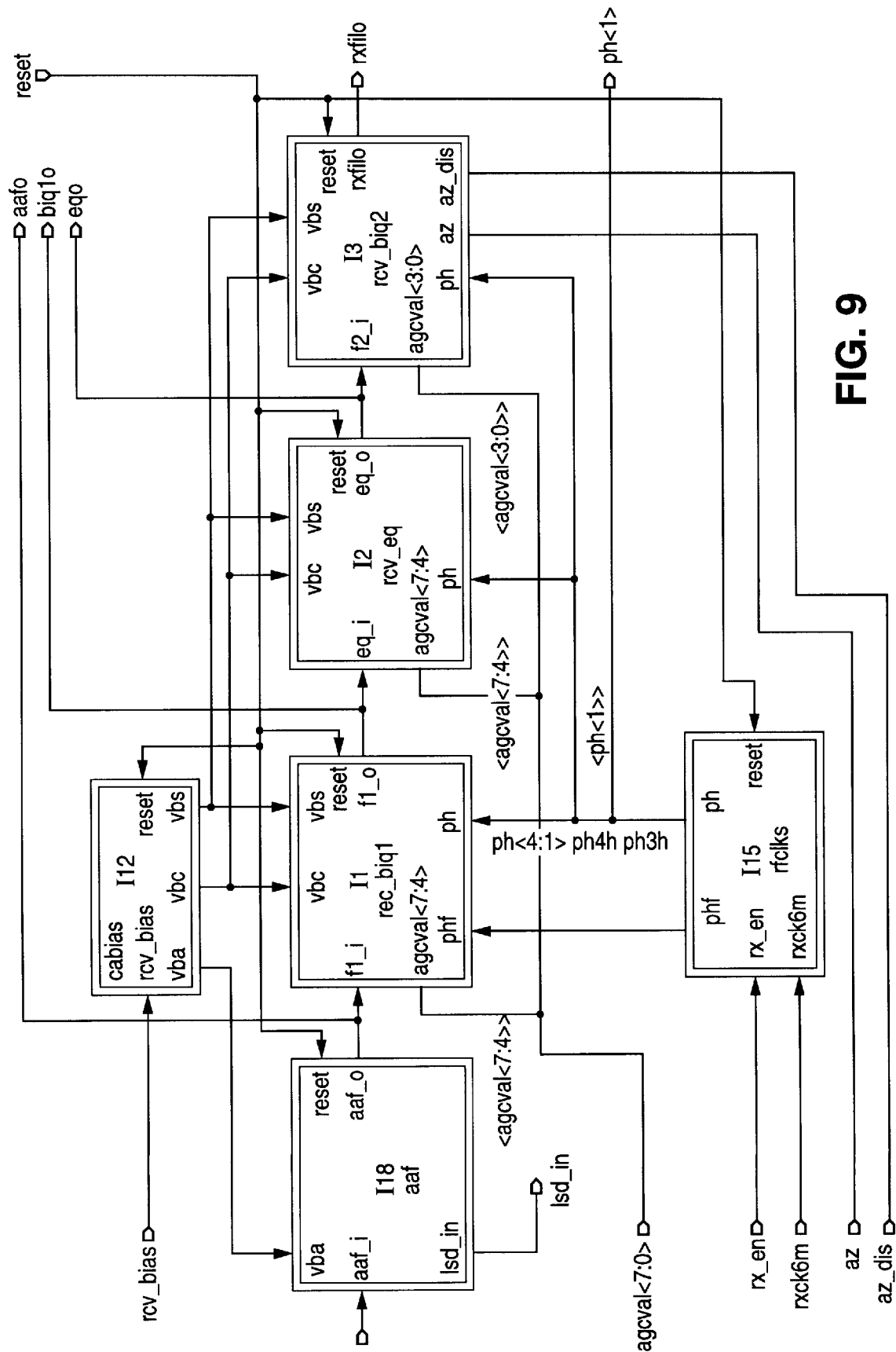
FIG. 9 is a block diagram illustrating further details of autozero circuitry in accordance with the present invention.
Figure 11:
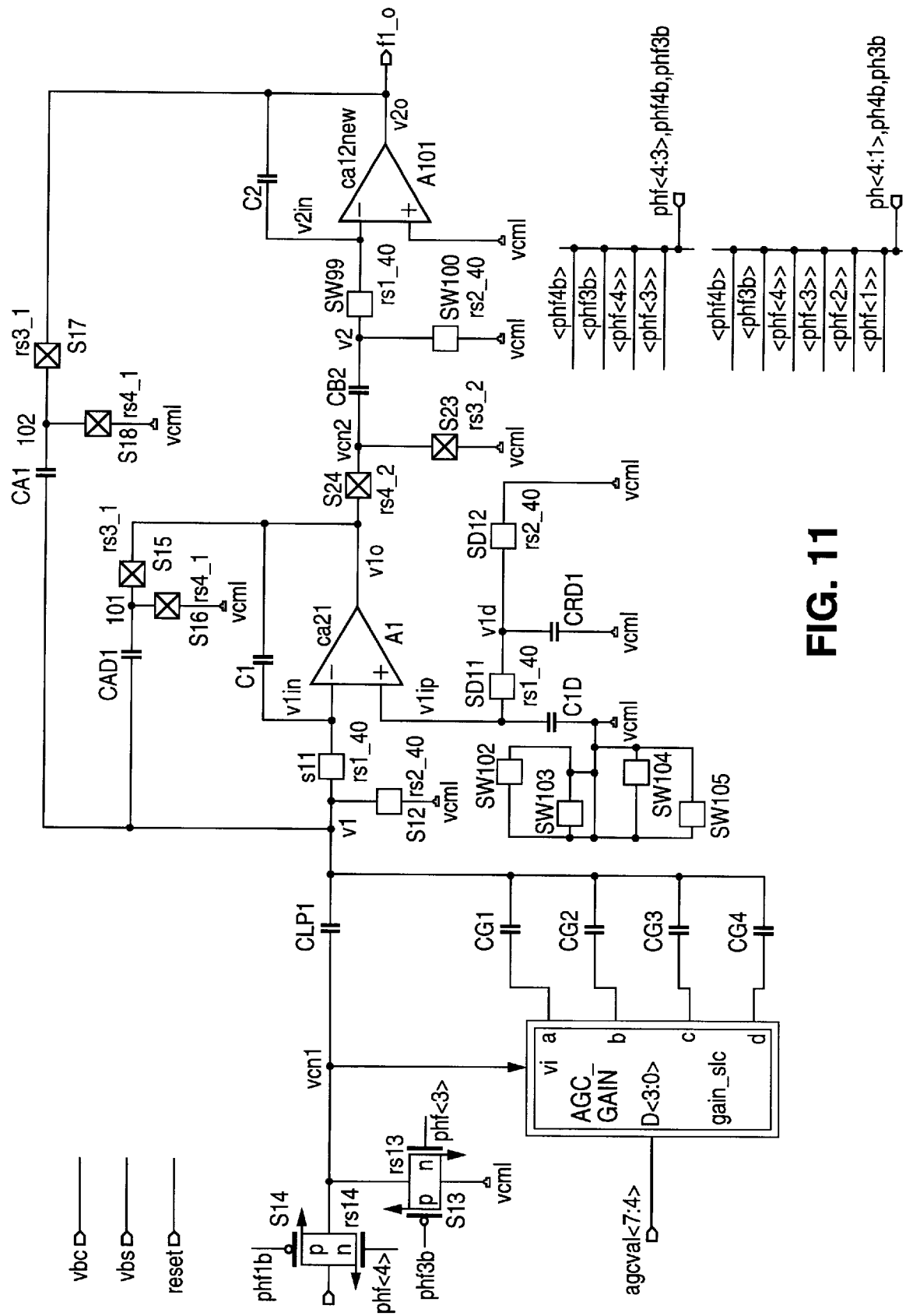
FIG. 11 is a schematic diagram illustrating details of the rcv_biql block in FIG. 9.
Figure 12:
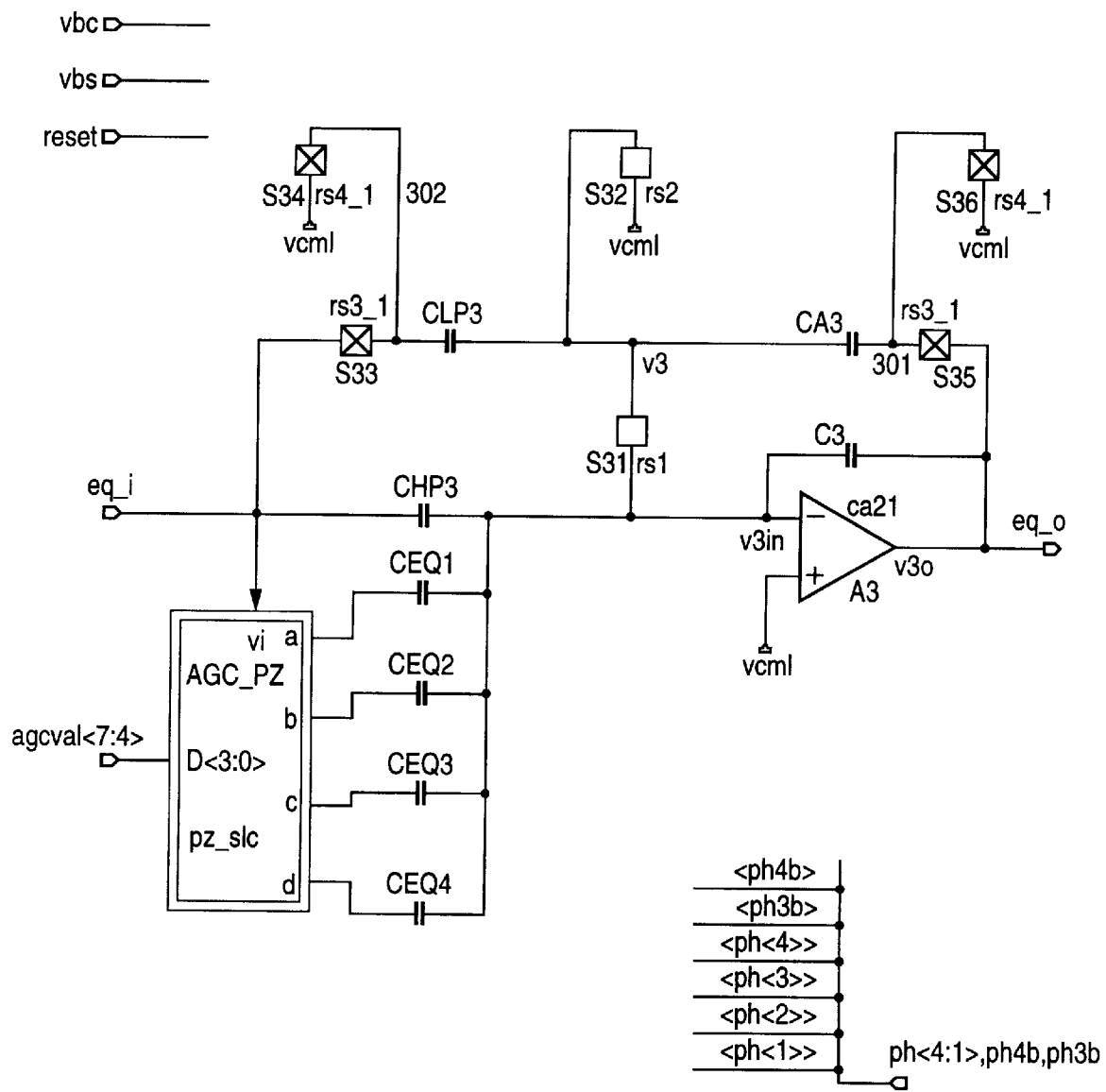
FIG. 12 is a schematic diagram illustrating details of the rcv_eq block in FIG. 9.
Figure 13:
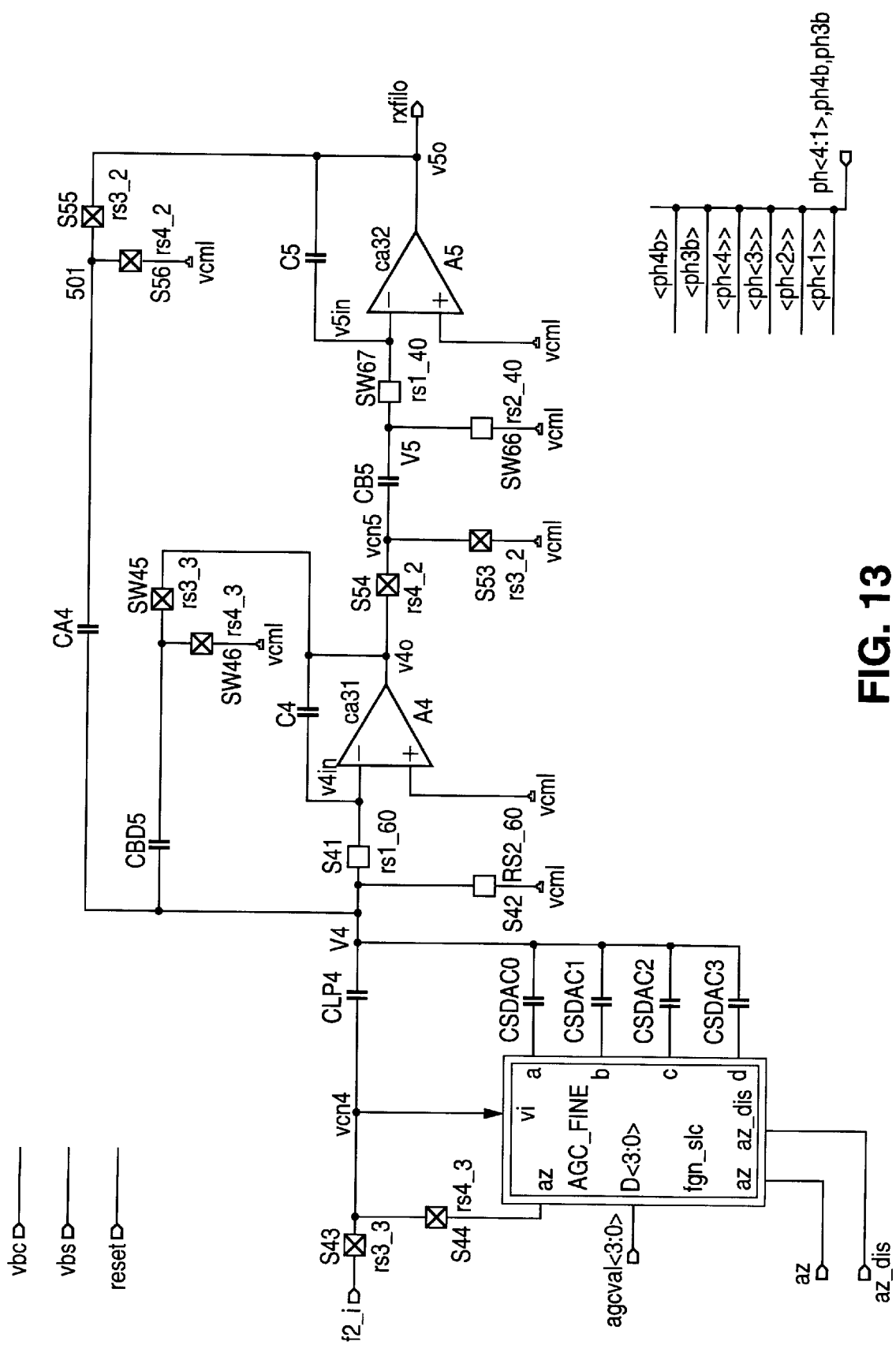
FIG. 13 is a schematic diagram illustrating details of the rcv_biq2 block in FIG. 9.
Figure 14:
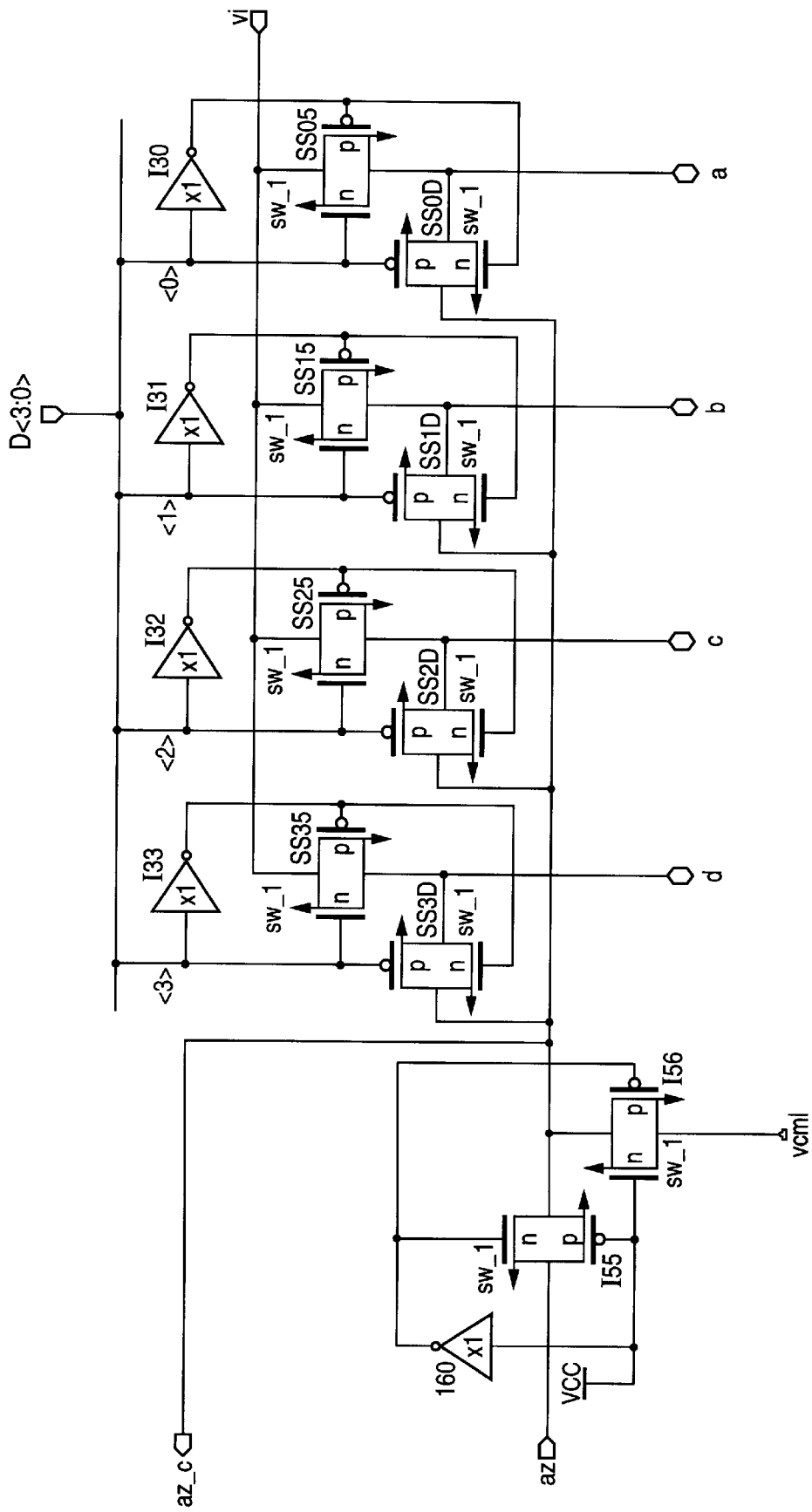
FIG. 14 is a schematic diagram illustrating details of the fgn_slc block in FIG. 13.

This design was implemented by removing the bottom plates of the fine AGC capacitors from Vcm and connecting them as shown in FIG. 3. The reference voltage comes from a band gap reference, Vref, which is connected to a resistor string. This resistor string is used to create all of the reference voltages on the chip and has been specially designed to provide sixteen 50 mV steps equally centered around Vcm. These sixteen reference voltages are then fed into an analog 16:1 multiplexor. The output of this multiplexor is buffered by a unity gain amplifier and feed into the bottom plates of the fine AGC. The control of the 16:1 multiplexor is dependent on four control bits provided by the digital section of the autozero design. The offset is cancelled by selecting one of the 16 steps from the 16:1 analog multiplexor. To insure that the data connection is established, the autozero is enabled only after waiting 128 (4 Khz frames) frames after the device has acquired SYNC. After the waiting period, the autozero circuit is enabled and the AGC state machine is modified to allow the AGC and the autozero to work together without interfering with each other. We wanted to eliminate the possibility of the AGC and the autozero making simultaneous updates to reduce the risk of creating a bit error due making an abrupt change to more that one PLL variable at the same time. This was accomplished by designing the AGC and autozero such that only one of them may change at the end of each frame. A ratio of 15:1 (15 autozero changes:1 AGC change) has been implemented.

The digital control functions are as follows:
controls the initialization and start-up of the autozero circuit after SYNC is achieved
measures the offset of the receive path by measuring the relative widths of mrkdetp and mrkdetn provides digital filtering of the offset data and allows only one autozero transition per frame provides 4 bits to control the analog 16:1 mux used to switch between different offset correction voltages test registers are provided to read the AZ register while the Sdasl is running set the value of the AZ register while the Sdasl is running set the lock the value of the AZ register while the Sdasl is running test access also provides efficient test coverage and bench access to the digital control of the autozero (see description of the AZ register for specific details)

resets the autozero after sync has been lost during data transmission

Figure 4:
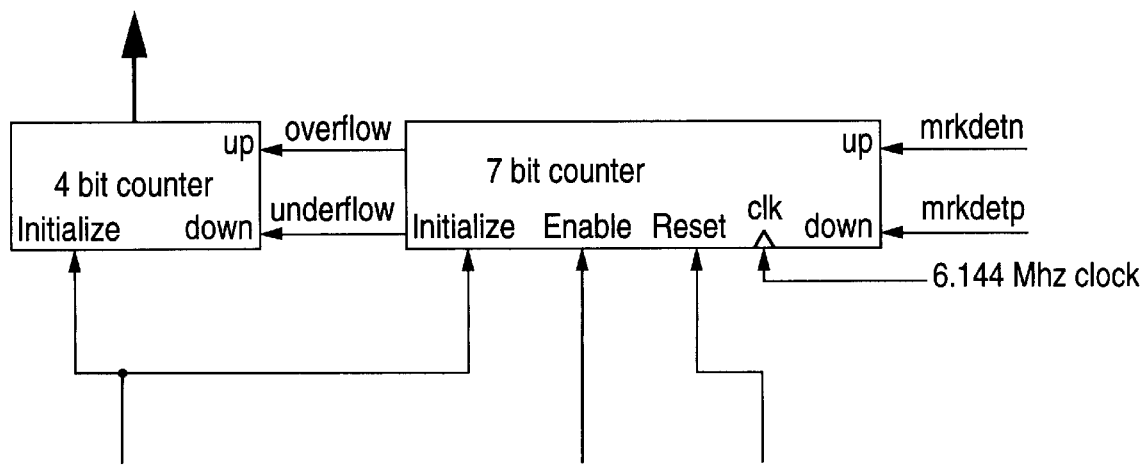
FIG. 4 is a block diagram illustrating autozero digital circuitry in accordance with the present invention.

The autozero digital circuitry provides all of the functionality described in the digital control functions list provided above. The following discussion will mainly focus on how the digital circuit implements measuring and making adjustments to correct for the offset of the system. The functionality of the start-up and test logic is relatively straight forward and can be understood by one skilled in the art from the basic digital block diagram provided in FIG. 4 and the test register description provided below.

The input to the digital portion of the autozero comes from the mrkdetp and mrkdetn which both come from the mark comparators. In an average data pulse with no offset, the average length of mrkdetp and mrkdetn is equal to the length of 8 (6.144 Mhz) clock periods. Either mrkdetp (positive mark=1) or mrkdetn (negative mark=1) is high when the data pulse being received is considered a logic 1 by one of the mark detect comparators. These two signals are connected to a 7 bit counter clocked at 6.144 Mhz as follows: mrkdetn is connected to count-down; mrkdetp is connected to count-up. A space will have no effect on the 7 bit counter since mrkdetp and mrkdetn will both be a logic 0.

The 7 bit counter measures the difference in the relative widths of mrkdetp and mrkdetn from the mark detect comparators. The offset for the system at point 'A' can be inferred by taking the average delta in mark widths over a number of samples. The 7 bit counter is used to provide digital filtering of this data. In this case, digital filtering refers to taking enough data samples to make sure the autozero updates only because there is a relative difference between the widths of mrkdetn and mrkdetp over a period of time.

A 7 bit counter is needed to measure the offset data over a large enough sample to filter out random noise and expected system variation not associated with the offset of the system. This counter is large enough to take a good average of the data before it will underflow or overflow indicating that an offset change is required. A 7 bit counter was chosen such that, under worst case offsets, the autozero would only make one correction per frame of average data.

The calculation of the size of the digital filter required:

worst case difference between mrkdetn and mrkdetp=6 clock periods there are an average of 9.5 mrkdetn and mrkdetp signal per frame of data Conclusion A digital filter of the size 2 * (9.5 * 6)=114, or lager is required Therefore, a counter of 7 bits or 128 counts was chosen as the design value.

At initialization, the 7 bit counter is set to its midpoint (100 0000) equidistant from the two end-stops which indicate an offset correction. Similarly, anytime the AGC or the autozero makes a transition, the counter is reset to its midpoint because the offset data it contains is no longer valid. These two conditions are sufficient to make sure that the 7 bit counter does not act on false or outdated data from the mark comparators.

When the 7 bit counter reaches an end-stop because the counter has reached its minimum or maximum value, a flag is set indicating whether the offset correction should be adjusted in a positive or a negative direction. This information is sent to a 4 bit counter which is responsible for keeping track of the offset correction value used by the analog 16:1 mux to choose which of the 16 resistor taps will be used to cancel the offset.

The 4 bit counter is adjusted according to the underflow/overflow flags set by the 7 bit counter at the end of each receive data frame when the autozero is enabled. This counter is reset to its midpoint upon initialization and will not roll over or under.

The analog mux (FIG. 3) is set up such that the midpoint of the 4 bit counter (1000) will connect Vcm to the bottom plates of the fine AGC capacitors just like the original design before the autozero was implemented. Other counter values will select which 50 mV increment above or below Vcm is required to cancel the offset of the system. Since the bottom plate of the AGC capacitors acts like an inverting node, a positive value added to Vcm compensates for a negative offset. The 4 bit counter does not reset itself back to its midpoint after an AGC change. This is because the offset correction factor should remain constant over all AGC gain settings, since the offset at point 'A' remains constant over all AGC settings.

At initialization, the autozero is disabled and the default values are set in the counters. After waiting 128 frames after sync is acquired, the autozero is enabled, at which time the 7 bit counter begins measuring the difference in width between the positive and negative mark comparator outputs. As soon as the 7 bit counter reaches an end-stop, a flag is set which updates the 4 bit counter at the end of the frame. Since the 4 bit counter directly controls the 16:1 analog multiplexor, this introduces either a positive or a negative offset correction depending on whether the 4 bit counter counts up or down. After the update to the 4 bit counter is made, the 7 bit counter is reset to its midpoint value and begins measuring the new system offset at the beginning of the next frame it is enabled. This operation continues to incrementally correct for the offset as long as the system remains in sync. (Note: the autozero is enabled for 15 out of 16 frames, as described above, and the 7 bit counter is not reset while the AGC is enabled. It is only reset if the AGC changes value.)

It is believed that the 15:1 ratio of autozero vs. AGC changes can cause a problem in high offset parts. If the offset is high, then the autozero can make several changes in a row without giving the AGC a chance to update. It is possible that 4 or 5 autozero changes in a row might knock the device out of SYNC because the offset correction might move the waveform out of the reliable mark detection range. Therefore, one additional feature is required to eliminate this possibility. Since is not desirable to have the autozero make multiple updates without giving the AGC a chance to make a correction, the 15:1 ratio holds only until the autozero makes an update to the 4 bits controlling the analog 16:1 mux. Allowing the AGC to have a chance to make an update after every autozero change ensures that the system remains in SYNC and settles to the proper state in all conditions.

It should be understood that various alternatives to the embodiments of the invention described herein may be employed in practicing the invention. Thus, it is intended that the following claims define the scope of the invention and that methods and structures within the scope of these claims and their equivalents be covered thereby.

What is claimed is:

1. A method of cancelling offset in a receive path that includes a coarse automatic gain control (AGC) function and a fine AGC function, the method comprising:

measuring the offset at an output of the receive path;

generating an offset correction feedback signal based on the offset at the output of the receive path; and applying the offset correction feedback signal to the receive path at a point between the coarse AGC function and the fine AGC function.

2. An autozero system that cancels the offset in a receive path that includes a coarse automatic gain control (AGC) function and a fine AGC function, the system comprising:

measurement circuitry that measures the offset at an ouput of the receive path;

an offset correction generator that generates an offset correction feedback signal based upon the offset measured at the ouput of the receive path; and circuitry that applies the offset correction feedback signal to the receive path at a point between the coarse AGC function and the fine AGC function.

3. A system as in claim 2 and which cancels the offset for use in an AMI system and which operates while data is being transmitted and does not require a training sequence.

4. A system as in claim 2 and further comprising a digital control system that allows the AGC and the autozero to be active in the same feedback loop and to interact with no adverse effects during data transmission.

* * * * *